(12) United States Patent
Prasad et al.

(10) Patent No.: US 9,450,655 B2
(45) Date of Patent: Sep. 20, 2016

(54) TWO-STAGE PRECODING AND USER GROUPING FOR LARGE SCALE MULTIPLE-INPUT MULTIPLE-OUTPUT (MIMO) SYSTEMS

(71) Applicant: NEC Laboratories America, Inc., Princeton, NJ (US)

(72) Inventors: Narayan Prasad, Wyncote, PA (US); Sampath Rangarajan, Bridgewater, NJ (US); Guosen Yue, Edison, NJ (US); Yi Xu, Princeton, NJ (US)

(73) Assignee: NEC Corporation (JP)

( * ) Notice: Subject to any disclaimer, the term of this patent is extended or adjusted under 35 U.S.C. 154(b) by 92 days.

(21) Appl. No.: 14/496,190

(22) Filed: Sep. 25, 2014

(65) Prior Publication Data
US 2015/0092556 A1    Apr. 2, 2015

Related U.S. Application Data

(60) Provisional application No. 61/883,548, filed on Sep. 27, 2013.

(51) Int. Cl.
*H04B 7/04*    (2006.01)
*H04L 5/00*    (2006.01)

(52) U.S. Cl.
CPC ............ *H04B 7/0452* (2013.01); *H04L 5/006* (2013.01); *H04L 5/0025* (2013.01); *H04L 5/0035* (2013.01); *H04L 5/0037* (2013.01); *H04L 5/0062* (2013.01)

(58) Field of Classification Search
None
See application file for complete search history.

(56) References Cited

U.S. PATENT DOCUMENTS

| | | | | |
|---|---|---|---|---|
| 2005/0185574 A1* | 8/2005 | Codreanu | ............... | H04L 5/006 370/208 |
| 2010/0217763 A1* | 8/2010 | Park | ..................... | H04B 7/0413 707/737 |
| 2012/0315938 A1* | 12/2012 | Van Nee | .............. | H04B 7/0434 455/507 |
| 2013/0016671 A1* | 1/2013 | Cheng | ................... | H04W 48/20 370/329 |
| 2013/0267239 A1* | 10/2013 | Stancanelli | ............ | H04B 7/024 455/452.1 |
| 2014/0161054 A1* | 6/2014 | Sandberg | ............. | H04B 7/0452 370/329 |
| 2014/0204841 A1* | 7/2014 | Ruiz Delgado | ...... | H04B 7/0689 370/328 |

* cited by examiner

*Primary Examiner* — Steven H Nguyen
(74) *Attorney, Agent, or Firm* — Joseph Kolodka (57) ABSTRACT

Methods are provided. A method includes determining respective weighted likelihoods corresponding to a plurality of users in a multiple-input multiple-output communication system. The method further includes forming a plurality of user groups from the plurality of users using an iterative K-means clustering technique applied to the plurality of users. The iterative K-means clustering technique is responsive to the respective weighted likelihoods.

14 Claims, 5 Drawing Sheets

TWO-STAGE PRECODING AND USER GROUPING FOR LARGE SCALE MULTIPLE-INPUT MULTIPLE-OUTPUT (MIMO) SYSTEMS

RELATED APPLICATION INFORMATION

This application claims priority to provisional application Ser. No. 61/883,548 filed on Sep. 27, 2013, incorporated herein by reference.

BACKGROUND

1. Technical Field

The present invention relates to signal processing, and more particularly to two-stage precoding and user grouping for large scale multiple-input multiple-output (MIMO) systems.

2. Description of the Related Art

Most of the existing work directed to large scale MIMO (multi-input-multi-output) systems considers a Time Division Duplex (TDD) mode. However, there are as many FDD (Frequency Division Duplex) systems as TDD systems in real-world deployments. To equip a large amount of antennas in the base station (BS) of a FDD system, a two-stage precoding scheme has been proposed. In particular, all the users in the system are divided into several groups. The first stage precoding is designed to suppress the interferences among different groups. The second stage precoding is designed to suppress the interferences among different users within each group. Given the precoding methods, how to group users has a direct impact on the throughput performance. Fixing the number of groups, the existing grouping method may group too many users in some particular groups and group none or too few users to the other groups. Also, with groups being formed, scheduling which users of each group are to transmit and which users are to remain silent also has big impacts on the throughput. As is evident, such an approach is not a sufficient way to utilize the precious spectrum resources.

SUMMARY

These and other drawbacks and disadvantages of the prior art are addressed by the present principles, which are directed to two-stage precoding and user grouping for large scale multiple-input multiple-output (MIMO) systems.

According to an aspect of the present principles, a method is provided. The method includes determining respective weighted likelihoods corresponding to a plurality of users in a multiple-input multiple-output communication system. The method further includes forming a plurality of user groups from the plurality of users using an iterative K-means clustering technique applied to the plurality of users. The iterative K-means clustering technique is responsive to the respective weighted likelihoods.

According to another aspect of the present principles, a method is provided. The method includes calculating respective rate gains for each of a plurality of users responsive to respectively adding each of the plurality of users to a given time slot in a multiple-input multiple-output communication system. The method further includes finding a maximum rate gain from among the respective rate gains. The method additionally includes scheduling a given one of the plurality of users with the maximum rate gain for the given time slot.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to two-stage precoding and user grouping for large scale multiple-input multiple-output (MIMO) systems. That is, various embodiments of the present principles are directed to user grouping, user scheduling, and load balancing problems relating to large scale MIMO systems.

In an embodiment, we propose several user grouping methods to achieve higher throughput or better load balancing. For example, in an embodiment, we propose an improved K-means clustering algorithm for general user grouping. In an embodiment, we also propose a user grouping algorithm with joint load balancing and precoding (prebeamforming) design.

In an embodiment, we also propose a dynamic user scheduling algorithm to enhance the system throughput. In an embodiment, the proposed dynamic user scheduling algorithm is a greedy algorithm, which achieves a local maximum at each step. Thus, a high throughput can be expected.

The proposed improved K-means clustering algorithm and dynamic user scheduling algorithm advantageously achieve higher system throughput than existing approaches. In an embodiment, the proposed improved K-means clustering algorithm considers the weights of different Eigenmodes, which brings about better classification of different users. The proposed loading balancing algorithm advantageously solves the problem of unbalanced group loading for large scale MIMO system.

Figure 1:
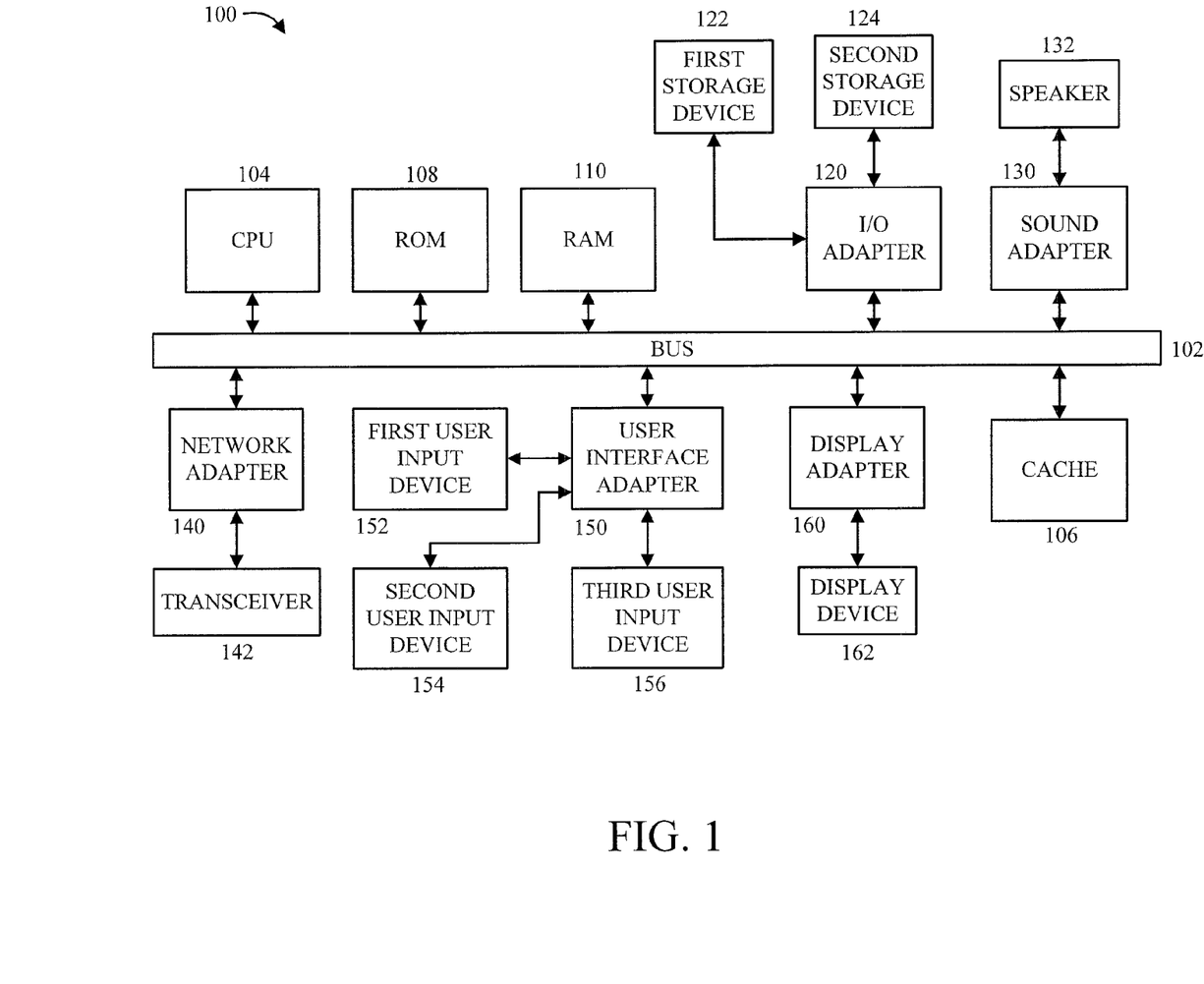
FIG. 1 shows an exemplary processing system 100 to which the present principles may be applied, in accordance with an embodiment of the present principles.

FIG. 1 shows an exemplary processing system 100 to which the present principles may be applied, according to an embodiment of the present principles, is shown. The processing system 100 includes at least one processor (CPU)

104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operative coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
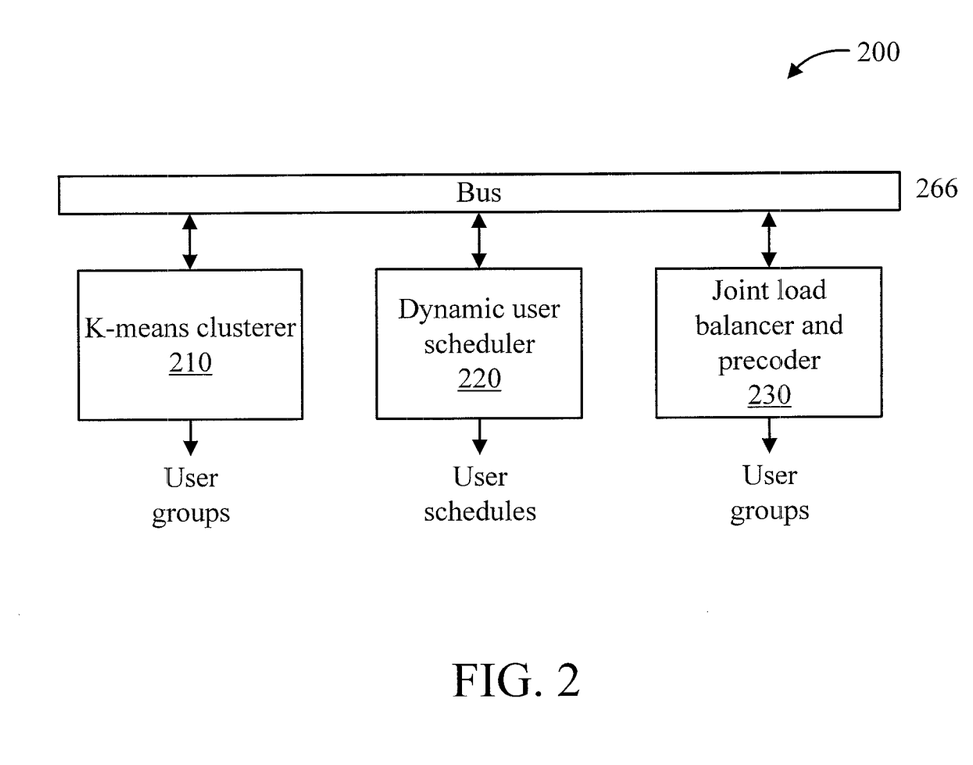
FIG. 2 shows an exemplary system 200 for precoding, user grouping, and user scheduling in a large scale multiple-input multiple-output (MIMO) communication system, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Further, it is to be appreciated that processing system 100 may perform at least part of the method described herein including, for example, at least part of any of methods 300-700 of FIGS. 3-7. Similarly, part or all of system 200 may be used to perform at least part of any of methods 300-700 of FIGS. 3-7.

FIG. 2 shows an exemplary system 200 for precoding, user grouping, and user scheduling in a large scale multiple-input multiple-output (MIMO) communication system, in accordance with an embodiment of the present principles.

The system 200 includes a K-means user clusterer 210, a dynamic user scheduler 220, and a joint load balancer and precoder 230, all interconnected by a bus 266. The K-means user clusterer 210 determines user groups. The dynamic user scheduler 220 determines user schedules. The joint load balancer and precoder 230 determines user groups. In an embodiment, at least the K-means clusterer 210 performs method 300 of FIG. 3, at least the dynamic user scheduler 220 performs method 400 of FIG. 4, and at least the joint load balancer and precoder 230 performs method 500 of FIG. 5.

Figure 3:
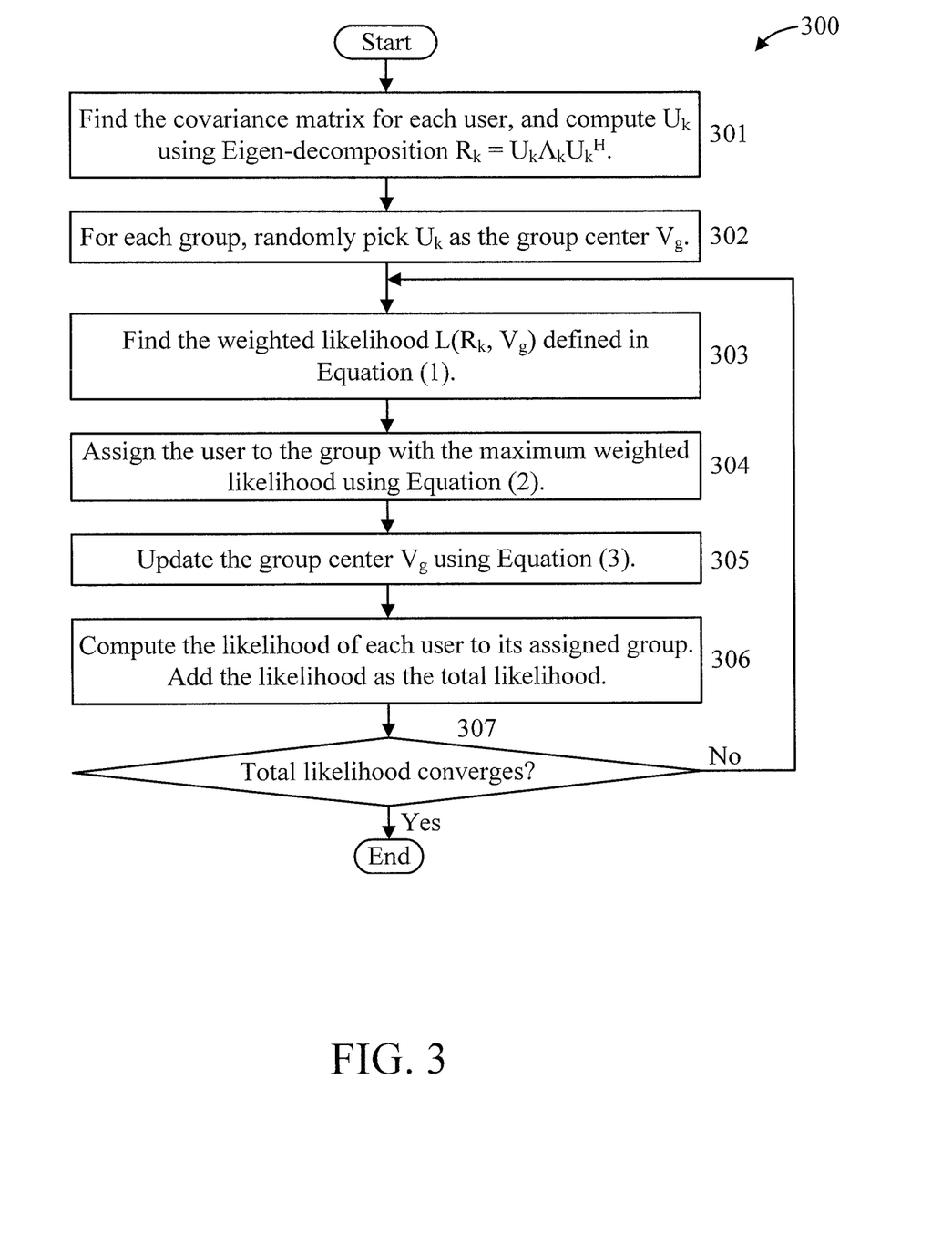
FIG. 3 shows an exemplary method 300 for assigning users to difference groups in a multiple-input multiple-output (MIMO) communication system using K-means clustering, in accordance with an embodiment of the present principles.

FIG. 3 shows an exemplary method 300 for assigning users to difference groups in a multiple-input multiple-output (MIMO) communication system using K-means clustering, in accordance with an embodiment of the present principles. Method 300 can be considered to correspond to algorithm 1 described herein.

Method 300 uses weighted likelihood as a criterion to assign users. The weighted likelihood takes the weight of different Eigenmodes into consideration. The update of the group center and total likelihood also considers the weights of different Eigenmodes.

At step 301, find the covariance matrix for each user, and compute $U_k$ using Eigen-decomposition $R_k = U_k \Lambda_k U_k^H$.

At step 302, for each group, randomly pick $U_k$ as the group center $V_g$.

At step 303, find the weighted likelihood $L(R_k, V_g)$ defined in Equation (1).

At step 304, assign the user to the group with the maximum weighted likelihood using Equation (2).

At step 305, update the group center $V_g$ using Equation (3).

At step 306, compute the likelihood of each user to its assigned group. Add the likelihood as the total likelihood.

At step 307, determine whether or not the likelihood converges. If so, then the method terminates. Otherwise, the method returns to step 303.

The following equations apply to method 300:

$$L(R_k, V_g) = \left\| (U_k \Lambda_k^{1/2})^H V_g \right\|_F^2 \tag{1}$$

$$g_k^* = \mathrm{argmax}_g\, L(R_k, V_g) \tag{2}$$

$$V_g = eig\left\{ \frac{1}{|S_g|} \sum_{k \in S_g} R_k \right\} \tag{3}$$

where eig denotes the unitary matrix after Eigen-decomposition, $S_g$ denotes the member set of group g, and $|S_g|$ denotes the number of group members in group g.

Figure 4:
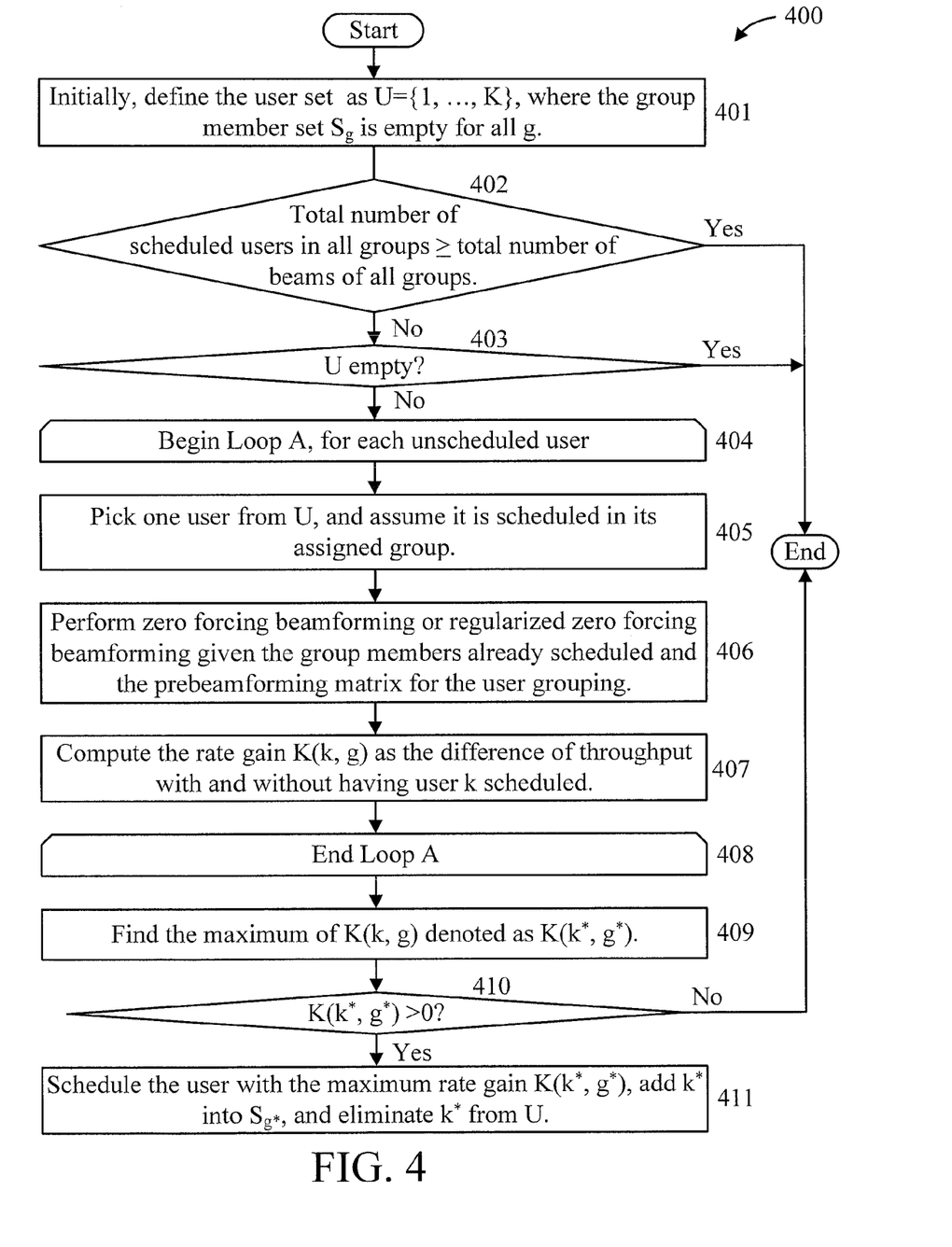
FIG. 4 shows an exemplary method 400 for user scheduling in a multiple-input multiple-output (MIMO) communication system using K-means clustering, in accordance with an embodiment of the present principles.

FIG. 4 shows an exemplary method 400 for user scheduling in a multiple-input multiple-output (MIMO) communication system using K-means clustering, in accordance with an embodiment of the present principles. Method 400 can be considered to correspond to algorithm 2 described herein.

Method 400 computes the throughput gains of adding each user given the set of users already scheduled (initially empty), and then finds the maximum one among them. Each time, the user with the maximum throughput gain is added to the set of users already scheduled. By doing this repeatedly, we can find the set of users to schedule.

At step 401, initially, define the user set as $U = \{1, \ldots, K\}$, where the group member set $S_g$ is empty for all g.

At step 402, determine whether or not the total number of scheduled users in all groups is greater than or equal to the total number of beams of all groups. If so, then the method is terminated. Otherwise, the method proceeds to step 403.

At step 403, determine whether or not U is empty. If so, then the method is terminated. Otherwise, the method continues to step 404.

At step 404, begin a Loop A, for each unscheduled user.

At step 405, pick one user from U, and assume it is scheduled in its assigned group.

At step 406, perform zero forcing beamforming or regularized zero forcing beamforming given the group members already scheduled and the prebeamforming matrix for the user grouping.

At step 407, compute the rate gain K(k, g) as the difference of throughput with and without having user k scheduled.

At step 408, end Loop A.

At step 409, find the maximum of K(k, g) denoted as K(k*, g*).

At step 410, determine whether or not K(k*, g*)>0.

At step 411, schedule the user with the maximum rate gain K(k*, g*), add k* into $S_{g*}$, and eliminate k* from U.

It is to be appreciated that steps 405, 406, and 407 are repeated for all unscheduled users.

Figure 5:
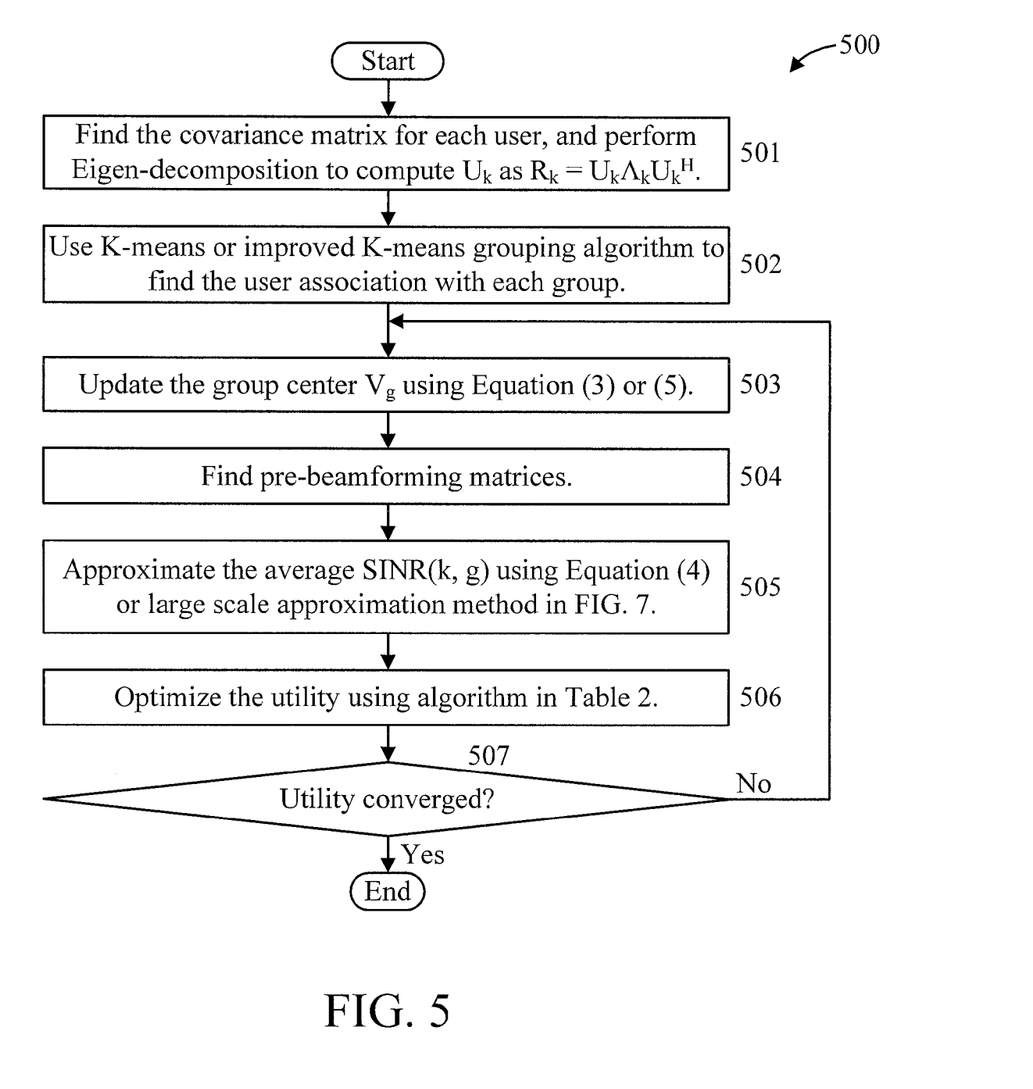
FIG. 5 shows an exemplary method 500 for user grouping with joint group load balancing and precoding design in a multiple-input multiple-output (MIMO) communication system using K-means clustering, in accordance with an embodiment of the present principles.

FIG. 5 shows an exemplary method 500 for user grouping with joint group load balancing and precoding design in a multiple-input multiple-output (MIMO) communication system using K-means clustering, in accordance with an embodiment of the present principles. Method 500 can be considered to correspond to algorithm 3 described herein.

At step 501, find the covariance matrix for each user, and perform Eigen-decomposition to compute $U_k$ as $R_k = U_k \Lambda_k U_k^H$.

At step 502, use K-means or improved K-means grouping algorithm to find the user association with each group.

At step 503, update the group center $V_g$ using Equation (3) or (5).

At step 504, find pre-beamforming matrices.

At step 505, approximate the average SINR(k, g) using Equation (4) or the large scale approximation method described herein. In an embodiment, the large scale approximation method is described with respect to algorithm 4. Of course, the present principles are not limited to solely the large scale approximation method described herein and, thus, other large scale approximation methods can also be used while maintaining the spirit of the present principles.

At step 506, optimize the utility using algorithm in Table 2.

At step 507, determine whether or not the utility has converged. If so, then the method is terminated. Otherwise, the method returns to step 503.

The following equations apply to method 500:

$$SINR(k, g) = \frac{\frac{P}{G}|tr(B_g^H R_{gk} B_g)|}{1 + \frac{P}{\Sigma_g b_g} \sum_{g' \neq g} |tr(B_{g'}^H R_{gk} B_{g'})|} \quad (4)$$

where SINR is defined as the Signal to Interference plus Noise Ratio.

$$V_g = eig\left\{\frac{1}{|S_g|} \sum_{k \in S_g} U_k U_k^H\right\} \quad (5)$$

(For K-means Clustering Algorithm), where eig denotes the unitary matrix after eigen-decompostion, $S_g$ denotes the member set of group g, and $|S_g|$ denotes the number of group members in group g.

TABLE 1 shows various notions applicable to the present principles, in accordance with an embodiment of the present principles.

TABLE 1

| | Dimension | Meaning |
|---|---|---|
| y | K × 1 | Signals received by all users |
| yg | $K_g$ × 1 | Signals received by group g |
| d | S × 1 | Signals transmitted for all users |
| dg | $S_g$ × 1 | Signals transmitted for group g |
| M | 1 × 1 | Number of antennas at the BS |
| H | M × K | Channel between BS and users |
| H | b × K | Effective channel between BS |
| S | 1 × 1 | Number of data stream |
| V | M × S | Precoding matrix |
| $R_k$ | M × M | Covariance matrix for user k |
| $h_k$ | M × 1 | Instantaneous channel for user k |
| B | M × b | Pre-beamforming matrix |
| P | b × S | Precoding matrix |
| $U_k$ | M × M | Unitary matrix composed of |
| $\Lambda_k$ | M × M | Diagonal matrix composed of |
| $V_g$ | M × M | Group center of group g |
| $\Lambda_g$ | M × M | dominant eigenvalues for group |
| Bg | M × $b_g$ | Pre-beamforming matrix for |
| Pg | $b_g$ × $S_g$ | Precoding matrix within each |
| z | K × 1 | Noise vector |
| zg | $K_g$ × 1 | Noise vector within each group |
| θ | 1 × 1 | Azimuth angle of user |
| s | 1 × 1 | Distance between BS and user |
| Δ | 1 × 1 | Angle spread |
| r | 1 × 1 | Radius of scattering ring |
| G | 1 × 1 | Number of groups |
| α | 1 × 1 | Parameter for RZFBF precoding |
| p | 1 × 1 | Total transmit power of BS |
| N | 1 × 1 | Scaling factor for antenna and |

Algorithm 1: Improved K-means Clustering Algorithm

1  Set n = 0, $L_{tot}^{(n)}$ = 0 and $S_g^{(0)}$ = ∅ for g=1, ..., G.
2  Randomly choose G different indices (denoted as π(g), ∀(g) from the set {1, ..., K} and set $V_g^{(0)} = U_{\pi(g)}$, ∀g ;
3  while $|L_{tot}^{(n)} - L_{tot}^{(n-1)}| > \epsilon L_{tot}^{(n-1)}$ do
4      n = n + 1 ; $S_g^{(n)}$ = ∅ for g=1, ..., G
5      for k=1, ..., K do
6         for g=1, ..., G do
7            Compute $L(R_k, V_g) = \left\|\left(U_k \Lambda_k^{\frac{1}{2}}\right)^H V_g^{(n-1)}\right\|_F^2$
8         end
9      end
10     Assign user k to group g such that g = arg $\max_g L(R_k, V_{g'})$
12     $S_g^{(n)} = S_g^{(n)} \cup \{k\}$
11     for g=1, ..., G do
13        $V_g^{(n)} = eig\left\{\frac{1}{|S_g^{(n)}|} \Sigma_{k \in S_g^{(n)}} R_k\right\}$
14     end
15 Compute $L_{tot}^{(n)} = \Sigma_{g=1}^G \Sigma_{k \in S_g^{(n)}} L(R_k, V_g)$
16 end
17 Assign $V_g = V_g^{(n)}$ and $S_g = S_g^{(n)}$.

Algorithm 2: Greedy algorithm for dynamic user selection and beamforming with determined user grouping 1  User grouping g̃ is given;
2  Initially set u = {1, ..., K}, the weighted sum rate $r_{ws}$ = 0 and -continued Algorithm 2: Greedy algorithm for dynamic user selection and beamforming with determined user grouping

```
    S_g^(0) = Ø for g = 1, ..., G. ;
 3  While Termination conditions (Σ_g |S_g| = Σ_g b_g, K(k*,g_{k*}) ≤ 0,
    or u = Ø) are not satisfied do
 4  |  For k ∈ u do
 5  |  |  Let g̃ = g_k;
 6  |  |  Set S'_g = S_g ∪ {k}, and S'_{g'} = S_{g'}, ∀g' ≠ g ;
 7  |  |  Perform ZFBF or RZFBF based on {S'_g} and {B_g} ;
 8  |  |  Compute the gain K(k,g) = max{0, r_{ws}({S'_g},
    |  |  {B_g}) − r_{ws}({S_g},{B_g})} ;
 9  |  End
10  |  Obtain (k*,g_{k*}) = arg max_{k∈u} K(k,g);
11  |  If K(k*,g_{k*}) > 0 then
12  |  |  Let ← u\k* ;
13  |  |  Let S_{g_{k*}} ← S_{g_{k*}} ∪ {k*} ;
14  |  End
15  End
```

Algorithm 3: User grouping with joint group load balancing and precoding design algorithm

```
 1  Perform Algorithm 1 to obtain user group ID x_{ij}.
 2  while Utility*^(n) − Utility*^(n−1) > ∈Utility*^(n−1) do
 3  |  for g ∈ G do
 4  |  |  Find V_g*^(n) using (21) or the proposed weighted
    |  |  likelihood (22)
 5  |  end
 6  |  for g ∈ G do
 7  |  |  Find Bg using Approximate BD approach
 8  |  end
 9  |  for k = 1,...,K do
10  |  |  for g = 1,....,G do
11  |  |  |  Find SINR (k,g) using Algorithm 6 or (23)
12  |  |  end
13  |  end
14  |
15  |
16  |  Optimize (19) using Algorithm 7 ;
17  |  Update x_{ij} and Utility*^(n)
18  end
```

Algorithm 4: Large Scale SINR Approximation

```
 1  for g = 1, . . . , G do
 2  |    Y_g = (1/|S_g|) Σ_{k∈S_g} U_k U_k^H,
 3  |    Ȳ_g = B_g^H Y_g B_g;
 4  |    while m_g^(n) − m_g^(n−1) > ∈m_g^(n−1) do
 5  |    |  Solve (24) iteratively to find m_g and updated T_g.
 6  |    end
 7  end
 8  for k = 1, . . . , K do
 9  |    for g = 1, . . . , G do
10  |    |  Solve (25) iteratively to find m_{g_k} and updated T_g.
11  |    |  Solve (26) and (27) with assumptions: (i) For target user,
    |    |  the transmit correlation is R_{g_k}; (ii) For intra group
    |    |  co-scheduled users, the transmit correlation is same
    |    |  as the average of the group; (iii) For inter group
    |    |  co-scheduled users, the transmit correlation is same as
    |    |  the average of the group.
12  |    end
13  end
```

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method, comprising:
   determining respective weighted likelihoods corresponding to a plurality of users in a multiple-input multiple-output communication system;
   forming a plurality of user groups from the plurality of users using an iterative K-means clustering technique applied to the plurality of users, the iterative K-means clustering technique being responsive to the respective weighted likelihoods; and
   incorporating the plurality of user groups into the multiple-input multiple-output communication system to increase throughput and load balancing in the multiple-input multiple-output communication system,
   wherein respective group centers of the plurality of groups are determined using Eigen-decomposition.

2. The method of claim 1, wherein the respective weighted likelihoods are determined responsive to a respective covariance matrix to each or a plurality of users and the respective group centers of the plurality of groups.

3. The method of claim 1, wherein the respective weighted likelihoods are determined responsive to a plurality of different Eigenmodes.

4. The method of claim 3, wherein the respective group centers and total likelihoods for each of the plurality of groups are determined responsive to the plurality of different Eigenmodes.

5. The method of claim 3, wherein the plurality of different Eigenmodes is determined responsive to a respective covariance matrix determined for each of the plurality of users.

6. The method of claim 1, further comprising approximating respective signal-to-interference-plus-noise ratios for each of the plurality of users.

7. The method of claim 6, wherein the respective signal-to-interference-plus-noise ratios are determined responsive to user grouping information and user scheduling information for a given time slot.

8. The method of claim 6, further comprising:
    finding a maximum signal-to-interference-plus-noise ratio from among the respective signal-to-interference-plus-noise ratios; and
    scheduling a given one of the plurality of users with the maximum signal-to-interference-plus-noise ratio for the given time slot.

9. The method of claim 6, further comprising determining a sum rate of at least some of the plurality of users responsive to corresponding ones of the respective signal-to-interference-plus-noise ratios determined therefor.

10. The method of claim 6, wherein the respective signal-to-interference-plus-noise ratios are determined responsive to respective pre-beamforming matrices determined for each of the plurality of groups.

11. The method of claim 6, wherein each of the respective signal-to-interference-plus-noise ratios is determined responsive to a respective precoding matrix.

12. The method of claim 11, wherein the respective precoding matrix corresponds to a two-stage precoding technique wherein interferences between the plurality of groups are suppressed in a first stage and interferences within each of the plurality of groups are suppressed in a second stage.

13. The method of claim 1, wherein said forming step forms the plurality of groups using a load balancing technique.

14. A non-transitory article of manufacture tangibly embodying a computer readable program which when executed causes a computer to perform the steps of claim 1.

* * * * *